United States Patent [19]

Boden

[11] Patent Number: 5,708,774
[45] Date of Patent: Jan. 13, 1998

[54] AUTOMATED TESTING OF SOFTWARE APPLICATION INTERFACES, OBJECT METHODS AND COMMANDS

[75] Inventor: Edward Barnes Boden, Vestal, N.Y.

[73] Assignee: International Business Machines Corporation, Armonk, N.Y.

[21] Appl. No.: 685,373

[22] Filed: Jul. 23, 1996

[51] Int. Cl.$^6$ .................................................. G06F 11/08
[52] U.S. Cl. ...................... 395/183.14; 395/13; 364/274; 364/274.1; 364/275.5
[58] Field of Search ................... 395/183.14, 183.13, 395/183.15, 183.22, 185.02, 185.03, 1, 13; 364/267, 274, 274.1, 275.5

[56] References Cited

U.S. PATENT DOCUMENTS

| | | | |
|---|---|---|---|
| 4,696,003 | 9/1987 | Kerr et al. | 371/19 |
| 4,926,427 | 5/1990 | Remein | 371/67.1 |
| 5,119,377 | 6/1992 | Cobb et al. | 371/19 |
| 5,193,178 | 3/1993 | Chillarege et al. | 395/575 |
| 5,343,554 | 8/1994 | Koza et al. | 395/13 |
| 5,357,527 | 10/1994 | Coates et al. | 371/37.4 |
| 5,455,938 | 10/1995 | Ahmed | 364/488 |
| 5,493,682 | 2/1996 | Tyra et al. | 395/700 |
| 5,513,315 | 4/1996 | Tierney et al. | 395/183.13 |

FOREIGN PATENT DOCUMENTS

| | | |
|---|---|---|
| 0666535A2 | 8/1994 | European Pat. Off. |
| 1721372 | of 1992 | Japan . |

OTHER PUBLICATIONS

Kakuda et al. Efficient Text Sequence Generation for Localization of Multiple Faults in Communication Protocols, IEEE, pp. 214–219; 1994.

R. Kösper. A Protocol Software Implementation &Text Environment. pp. 31–43.

Aylor, et al. GATE—A Genetic Algorithm for Compacting Randomly Generated Test Sets, Int'l Journal of Computer Aided VLSI Design 3, pp. 259–272 (1991).

Davis, Ed. Handbook of Genetic Algorithms, NY, NY. Van Nostrand Reinhold (1991) pp. 72–90.

Goldberg. Genetic Algorithms in Search, Optimization & Machine Learning, Reading MA: Addison Wesley Publ Co. (1989) pp. 10–14, 70–87.

Nordin, et al, "Evolving Turing–Complete Programs . . . "; in Proceedings of the Sixth Int'l Conf. on Genetic Algorithms, San Francisco, CA, 1995).

Jones, "Crossover, Macromutation, and Population–based Search", in Proceedings of the Sixth International Conference on Genetic Algorithms, San Francisco, CA: (1995), pp.73–80.

Koza, Genetic Programming: On the Programming of Computers by Means of Natural Selection, Cambridge, MA. (1992), pp. 63–77.

Hillis, "Co–evolving Parasites Improve Simulated Evolution as an Optimization Procedure", in Artificial Life II. Reading, MA: Addison–Wesley Pub Co (1990) pp. 313–324.

IBM Technical Disclosure Bulletin, vol. 37, No.07, Jul. 1994, "Knowledge Base Structure for Fault Management".

IBM Technical Disclosure Bulletin, vol. 36, No.09B, Sep. 1993, "Automated Code Checker".

IBM Technical Disclosure Bulletin, vol. 31, No.5, Oct. 1988, "Proven Automated Software Reliability Estimation System".

IBM Technical Disclosure Bulletin, vol. 38, No.02, Feb. 1995, "Bus Unit Controller Freeze on Program Input/Outpug Error".

IBM Technical Disclosure Bulletin, vol. 37, No. 06B, Jun. 1994, "Software Error Early Detection and Data Capture Smart Entry".

*Primary Examiner*—Robert W. Beausoliel, Jr.
*Assistant Examiner*—Dieu-Minh Le
*Attorney, Agent, or Firm*—Shelley M. Beckstrand; Richard M. Goldman

[57] ABSTRACT

Automated testing of software application interfaces, object methods and commands, including testing software using order-based genetic algorithms to search for and detect symptoms of software errors by generating test sequences which converge on points in invocation space more likely to cause error symptoms.

12 Claims, 3 Drawing Sheets

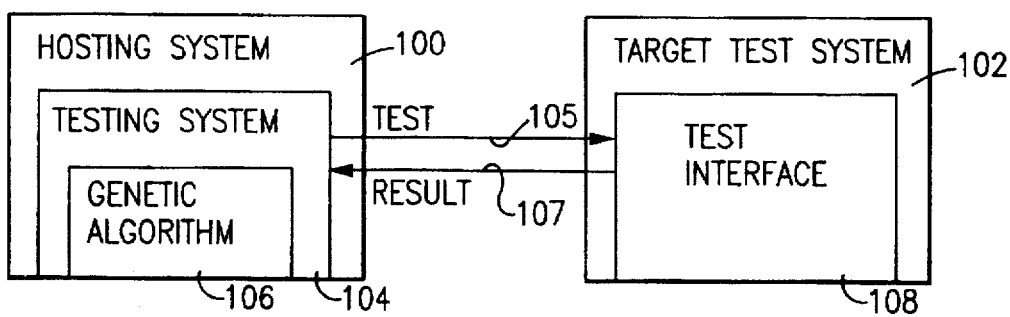
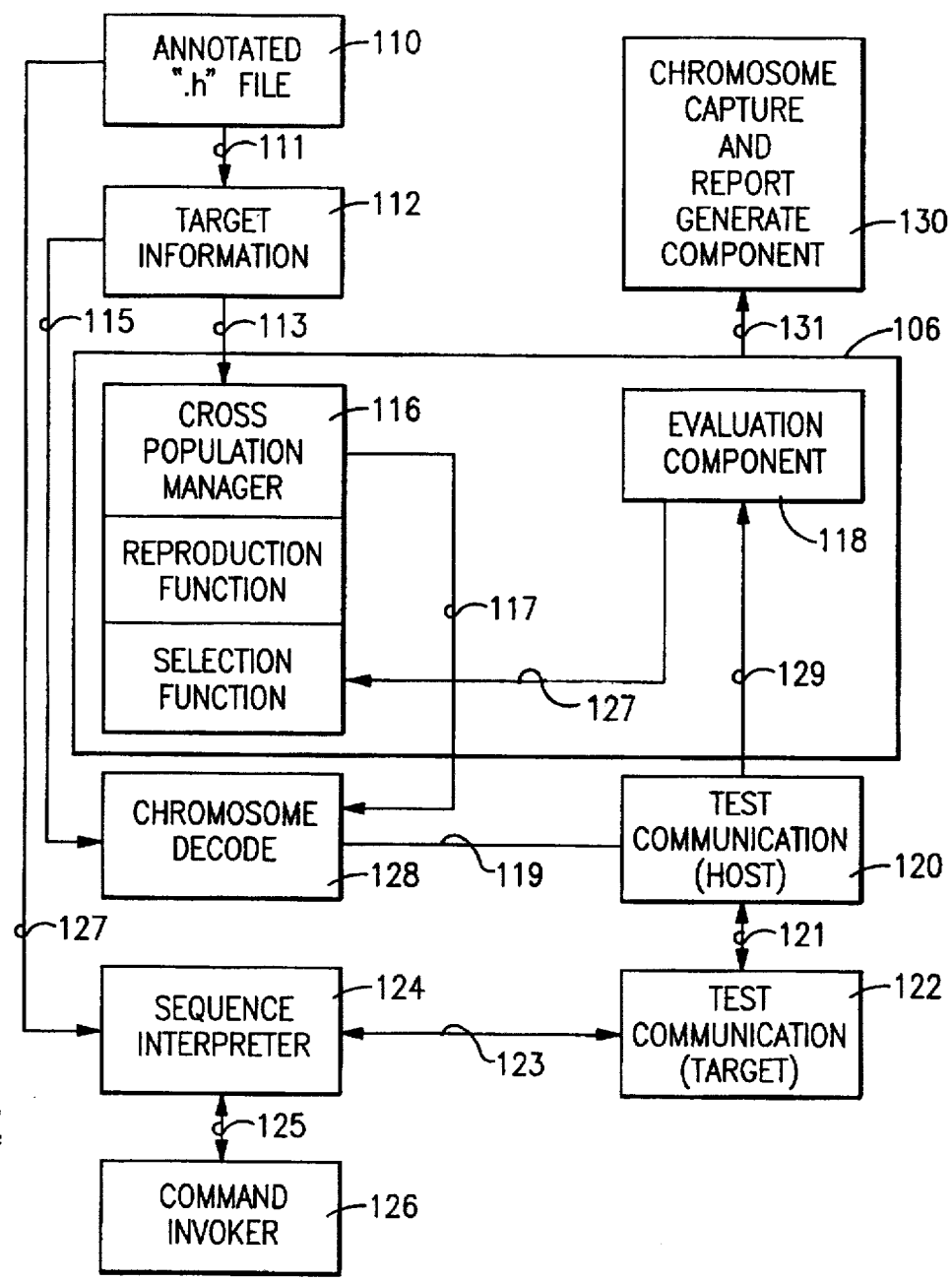

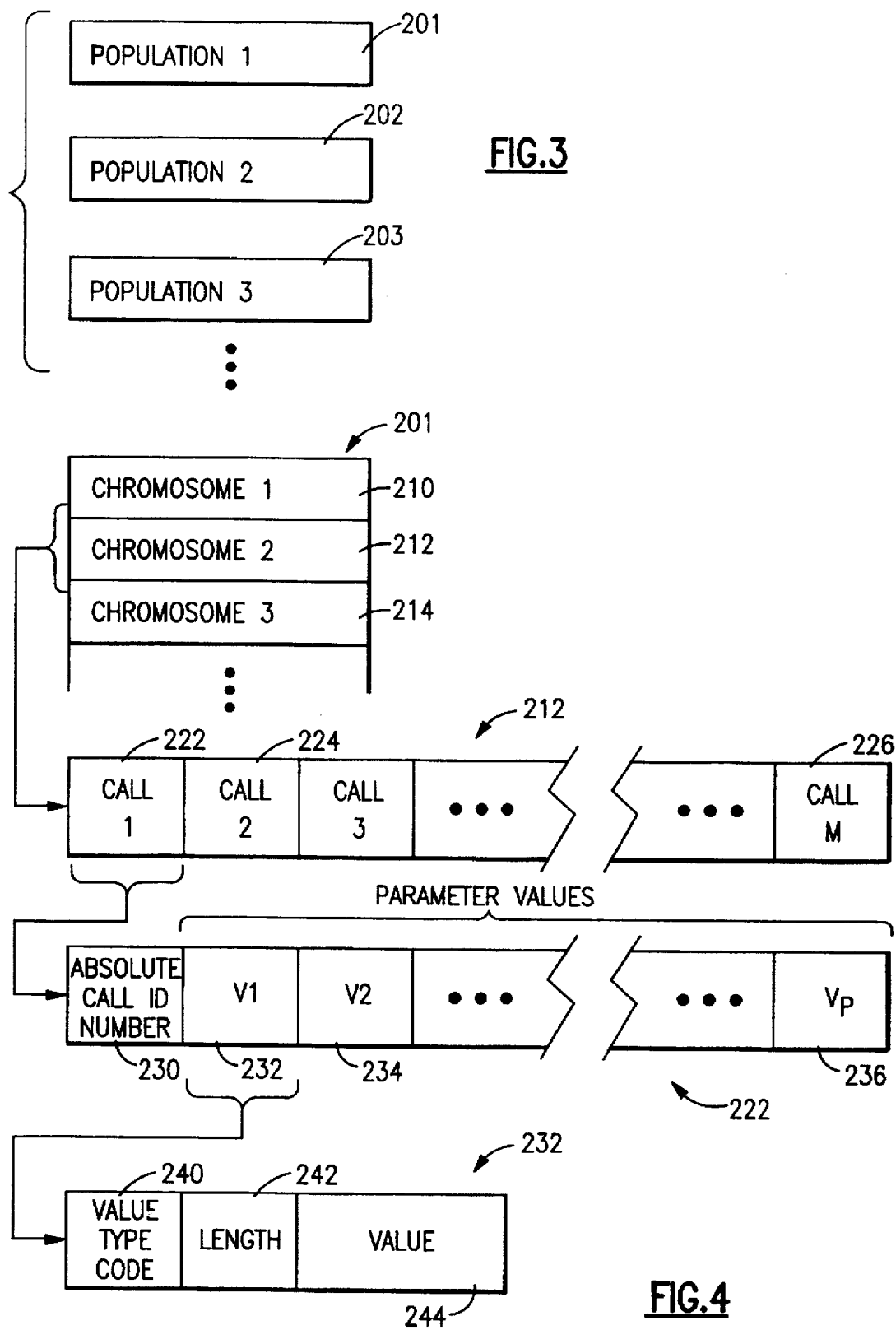

AUTOMATED TESTING OF SOFTWARE APPLICATION INTERFACES, OBJECT METHODS AND COMMANDS

BACKGROUND OF THE INVENTION

1. Technical Field of the Invention

This invention pertains to automated testing of software application interfaces, object methods and commands. In particular, this invention provides for testing software using order-based genetic algorithms.

2. Background Art

The cost to software vendors of errors in shipped products is high. Estimates of the cost to correct a single software bug range from $20,000 to $100,000. And although testing is extensive for function shipped as Application Programming Interfaces (APIs) or commands, it is far from exhaustive, due to the huge number of combinations. Hence, providers are left at the end of the development cycle with software that is likely to have some number of errors remaining (dependent of course, on size, complexity, and prior error history), and little choice but to ship anyway and treat the resulting errors as a cost of doing business.

Callable Application Programming Interfaces (APIs) are widely used by software vendors to provide function which customers and other vendors can use to build additional capability. The subroutine libraries shipped with compilers are a common example of what is termed here a set of APIs. For example, the ANSI C programming language specifies a number of standard include (.h) files, which have function prototypes for well-known routines like printf( ), malloc( ), memcpy( ), strtok( ) and many more.

Contemporary operating systems ship many APIs (e.g. the IBM AS/400 operating system ships over 800), and many middleware products and applications also ship APIs (e.g. Lotus Notes). Industry trends such as client/server, open systems, and now the internet, have all tended to drive APIs. Some examples are:

IEEE POSIX 1001.3 (alone) specifies approximately 236 APIs. See, *POSIX.1 ANSI/IEEE* 1003.1, Piscataway, N.J.: IEEE Service Center.

Open Software Foundation's Distributed Computing Environment (OSF DCE) specifies about 455 APIs. See, *OSF DCE Application Development Reference*, Englewood Cliffs, N.J.: Prentice Hall.

Microsoft's Windows 95, in such functional groups as MFC, OLE, MAPI, TAPI, etc. has over 400 API routines and object methods. See, *Programming Windows* 95 Unleashed, Indianapolis, Ind.: SAMS Publishing.

The Taligent class summary document defines over 1100 classes, and well over 5000 methods. See, *Taligent Class Summary*, 10201 North De Anza Boulevard, Cupertino Calif.: Taligent Inc.

In addition to APIs, operating systems deliver function which is typically used directly by users, in the form of commands (e.g. DOS 'dir', Unix 'ls'). Even a relatively simple operating system such as the IBM PC DOS 7 has over 150 commands and the IBM AS/400 operating system ships over 850 commands. Most software products (applications) also deliver function as commands. Even when the product will execute in some windowed environment (e.g. Motif or Windows 95), vendors have found that customers often want the function available by command, in addition to windows, so that the commands can be automated via scripts (e.g. Unix ksh, Rexx).

Hillis's investigations of using simulated evolution to solve an optimization problem, used co-evolving parasites which represented sorting procedures. See, Hillis, D., "Co-evolving Parasites Improve Simulated Evolution as an Optimization Procedure", in *Artificial Life II*, edited by C. Langton, C. Taylor, J. Farmer and S. Rasmussen (1990). Reading, Mass.: Addison-Wesley Publishing Company, Inc.

Genetic programming (GP) has been described by Koza. See, Koza, J. R., *Genetic Programming: On the Programming of Computers by Means of Natural Selection*, Cambridge, Mass.: MIT Press, 1992.

A genotype studied by Nordin was machine-language programs in memory (linear sequences of instructions). See, Nordin, P., Banzhaf, W., "Evolving Turing-Complete Programs for a Register Machine with Self-modifying Code", in *Proceedings of the Sixth International Conference on Genetic Algorithms*, San Francisco, Calif. (1995): Morgan Kaufmann Publishers Inc. In Nordin, genetic operators are appropriately defined: for example crossover is restricted to the machine instruction boundary, but work on any of a selected instruction set. Nordin's 'unrestricted crossover' is 'crucial to the design', and allows the operator to work blindly, without regard to what kind of instructions are moved. At a different level of abstraction, and hence function, the present invention also employs unrestricted crossover on linear sequences of 'instructions', but uses programs trees as the genotype, and directly evolves them.

Aylor et al. studied the use of genetic algorithms for test vector generation for 'combinational' VLSI circuits. See, Aylor, J. H., Cohoon, J. P., Feldhousen, E. L., Johnson, B. W., "GATE-A Genetic Algorithm for Compacting Randomly Generated Test Sets". *International Journal of Computer Aided VLSi Design*, Vol 3, pp 259–272 (1991). They first generated test sets using random methods, then used GAs to optimize and reduce overlapping coverage. They found consistently better test sets, in terms of test set size, with no loss of fault coverage, when run on two well-known benchmark circuits. They did not use GAs to generate tests directly.

As previously noted, when testing software API's and commands, there are several stages in the development process that may consume several months of effort. Testing software doesn't end with the shipment of the product to the customer, in some ways it just begins. Customers find software bugs all the time, and fixing these bugs is an enormous expense to the software company. If there were a way to prevent even one bug from getting into the field (the customer), this would save not only the above noted cost to the software company, but also would save the customer the aggravation of having to get this 'bug' fixed.

There are hundreds and thousands of API's and commands for a typical operating system. Each of these types of interfaces to the operating system has a set of parameters which can have varying value sets. Each of the calls can also be issued in an almost infinite number of different sequences. When a command or API is tested it will return a completion type of message to the user, an error condition, or a fatal error that requires service.

There is, therefore, a need in the art for a system and method for testing sequences of API's and commands with a huge number of varying parameters to obtain unacceptable errors in the software.

Consequently, it is an object of the invention to apply genetic programming to the identification of errors in existing software.

It is a further object of the invention to use order-based genetic algorithms (GAs) to help find software errors, as an adjunct to existing software test techniques and methods.

It is a further object of the invention to use and directly evolve programs trees as a genetic programming genotype.

It is a further object of the invention to provide for the use of genetic algorithms to generate API or command sequences that cause errors in pre-existing software, which is not subject to simulated evolution.

A major strength of genetic algorithms (GAs) is the ability to search large problem spaces, given a suitable fitness function. It is, therefore a further object of this invention to utilize GAs to find software errors in software APIs and commands, including those that have completed development, and therefore may be assumed to contain no, or very few, errors; including a testing facility in which a GA is used to generate API tests, and a fitness function which usefully guides the GA selection to find API errors.

SUMMARY OF THE INVENTION

This invention provides a system and method for searching for and detecting symptoms of software errors by generating test sequences which converge on points in invocation space more likely to cause error symptoms.

Other features and advantages of this invention will become apparent from the following detailed description of the presently preferred embodiment of the invention, taken in conjunction with the accompanying drawings.

BRIEF DESCRIPTION OF THE DRAWINGS

FIG. 1 is a diagrammatic representation of the system of the invention.

FIG. 2 is a more detailed diagrammatic representation of the invention.

FIG. 3 is a diagrammatic representation of a series of populations of test sequences.

FIG. 4 is a diagrammatic representation of a call sequence.

BEST MODE FOR CARRYING OUT THE INVENTION

Figure 5:
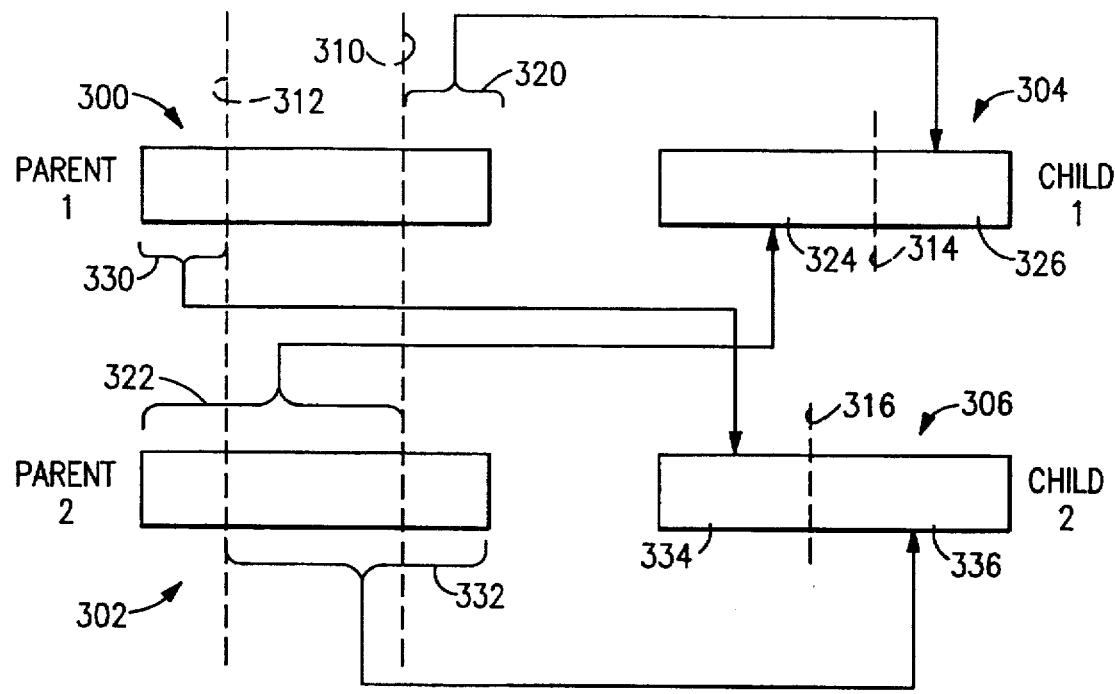
FIG. 5 is a diagrammatic representation of a reproduction function, whereby two children are generated from the chromosomes of two parents.

Referring to FIG. 1, the apparatus of the invention includes hosting system 100 and target test system 102, providing a genetic algorithm (GA) approach to the software testing problem. Genetic algorithm 106 resides within testing system 104, and test interface 108 resides within target test system 102. Testing system 104 manages multiple generations of test sequences by generating, in a manner to be described hereafter, tests which are fed on line 105 to test interface 108. Results are fed back on line 107. A test is a call sequence or invocation sequence, such as "Do A, Do B, . . . , Do K", where A, B and K are calls. Some key facilities of GA based testing facility 106 include the following: the generation of test calls to the APIs is based on detailed information about each API and parameter, a GA genotype represents a sequence of calls (rather than a single call), the individuals in the GA population also contain API parameter information—typically either an actual value or a coded value.

Referring to FIG. 2, the system of the invention will be further described. Annotated .h file 110 provides knowledge about the APIs under test. That is, annotated .h file 110 comprises annotated C++ standard include (.h) files, which have function prototypes for well-known routines like printf( ), malloc( ), memcpy( ), strtok( ) and many more. Annotating .h file 110 for a set of APIs generally includes adding information about each entry-point concerning return values and parameter values. More specifically, a) for APIs that return values, a set of possible values is specified; b) for each parameter, a notation is made as to whether the parameter is input to the routine, output, or both; and c) for each parameter, a set of possible values is specified. A set of values may be specified in various ways, including: a) as a numeric, with upper only, lower only, or upper and lower bounds; b) as a discrete set of numeric or literal values; c) as one or more references to APIs results or API parameters; and d) as the length (in bytes) of an API result or parameter.

For the program to function, the genetic algorithm will require code on the AS/400 which will call the correct API and use the parameters specified. There are three parts to this code, which indicate the value sets required, the API's used, the number of parameters on each of the API's and the fitness associated with specified sequences. All of this code needs to be provided by the user of this software GA program.

Data and control from file 110 is fed on line 111 to target information block 112, and data on line 127 to sequence interpreter 124. (All lines interconnecting the functional blocks in FIG. 2, except data line 127, represent both data and control.) Target information block 112 output, represented by line 113, is fed to cross population manager 116, which includes a reproduction function and a selection function, and together with evaluation component 116 comprises genetic algorithm 106. The output of cross population manager 116, represented by line 117, is fed to chromosome decode block 128, along with the output of target information block 112, as is represented by line 115. The output of chromosome decode 128, represented by line 119, is fed to test communication block 120 at hosting system 100. Communication block, as is represented by line 121, communicates with test communication block 122 at target test system 102. Target communication block 122, as is represented by line 123, communicates with sequence interpreter 124 which, as is represented by line 125, communicates with command invoker 126.

As illustrated in FIG. 2, the user of the software testing facility of the invention provides the annotated .h file 110, as described above, and command invoker 126. In command invoker 126, the user of the GA test program provides an implementation of a routine that is used to call the APIs. Sequence interpreter 124 generates a set of parameters, parameter values and a function code. These are then passed to command invoker 126, which will call the corresponding entry-point with the supplied parameters and return the result to sequence interpreter 124.

Target information block 112, responsive to annotated .h file 110, provides a collection of call codes. These codes are provided to (a) cross population manager 116, as will be described hereafter in connection with FIG. 3, for generating (in GA terms, the reproduction function) the first and subsequent populations of test sequences; and (b) to chromosome decode block 128, as will be described hereafter in connection with FIG. 6, for interpreting chromosomes.

Referring to FIG. 3, cross population manager 116 generates first population 201 of test sequences, herein a random selection of test sequences (individuals) based upon knowledge of the target test system provided by target information block 112. As will be described hereafter in connection with FIG. 5, subsequent populations 202, 203 of test sequences are based upon relative fitness factors derived from individuals in parent populations. Cross population manager 116 passes these populations 201, 202, 203 of test sequences (each test sequence within a population of test sequences being a chromosome) to chromosome decode block 128.

Referring to FIG. 4, chromosome decode 128, responsive to a population, say 201, of chromosomes 210, 212, 214 converts each such chromosome, say 212, into a sequence of calls 222, 224, 226, and that sequence of calls into a communications byte stream which it passes to test communication block 120. In this example, call 222 includes absolute call ID number 230, and a series of parameter values VA 232, V2 234 and Vp 236. Each parameter value, such as parameter 232 includes value type code 240, value 244, and may include length 242. One of five basic value types is coded into field 240, selected from the set short int, int, float, double float, char*, and void*. In the case of void*, this is a value type used to code references to API results and API parameters. As generated by chromosome decoder 128, these references become relative references within a particular call sequence. For example, parameter 2 of call 8 in a given sequence might be an input parameter with the value of the output parameter 4 of call 2. This is appropriately encoded in the value field. For value types short int, int, float, and double float, length field 242 is not present inasmuch as these fields have a fixed, known length.

Figure 6:
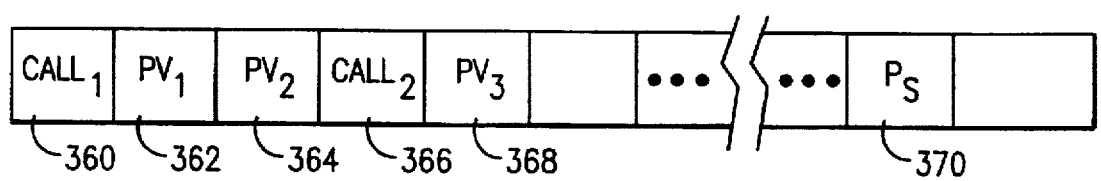
FIG. 6 is a diagrammatic representation of the interpretation of a chromosome.

Referring to FIG. 6, the manner in which chromosome decode converts a chromosome 304 into a sequence of calls is as follows: Interpreter 128 interprets chromosome 304 N bits at a time, arbitrarily deciding that the first N-bit substream 360 is a call. Given the value in substream 360, interpreter 128 determines from target information block 112 the corresponding call, the number of parameters and their type, and from successive bit streams 362, 364 (assuming two parameters for this call), the parameter values. The next N-bit substream 366, following the last parameter value 364 for the preceding call 360, is arbitrarily selected as the next call, and the process iterates. This continues until some special value is encountered in, say, field 370 of some chromosome, whereupon it stops. The special value is selected such that the number of resulting calls is a statistically useful number, which is a function of the number of unique calls in, and the internal referential complexity of, the total set of calls.

Referring further to FIG. 2, test communication block 120 at host 100, and test communication block 122 at target test system 102, handle the communication byte stream. In this example, host 100 may be an AIX system, target test system an IBM AS/400 system, and the communication link 120, 121, 122 a TCP/IP link.

Test communication block 122 passes the communication byte stream to sequence interpreter 124. Sequence interpreter 124 reads, as is represented by line 127, annotated .h file 110 to get the information required to issue a call to command invoker 126. For example, sequence interpreter reads .h file 110 to determine the call (say, r1) corresponding to the absolute call ID number in field 230, and issues the call r1 together with its associated parameter values 232, 234, 236 to command invoker 126. Command invoker 126 executes the command, packages the results (including any error messages, return calls, protocol strings, etc.) for each individual call sequence, and sends the packaged results back to evaluation component 118, as is represented by lines 123, 121 and 129.

Evaluation component 118 executes the fitness function. That is, it evaluates the results for an individual call sequence and assigns to it a fitness function, and iterates that evaluation until all, or some significant portion of, individuals are evaluated. The result is an evaluated population, which is fed back to the selection function of cross population manager 116, as is represented by line 127.

Population manager 116 next generates a new population using, in this embodiment, a standard roulette wheel GA selection function. That is, each individual in the current population 202 is selected to be a parent of a child in the next population 203 based upon its relative fitness in the current population. Thus, the reproduction function of cross population manager 116 may select the same individual with a high fitness value many times, where those individuals of low fitness value may not be selected at all, in generating the children for next population 203.

Referring to FIG. 5, cross population manager 116 from two parent chromosomes 300, 302 creates two child chromosomes 304, 306 using single point cross over, and repeats this process of selecting parents, based on the fitness function, two at a time from the previous population and creating children two at a time, until the resulting population is full. As illustrated in FIG. 5, the single point cross over reproduction function proceeds as follows. Randomly selected boundary points 310 and 312 are selected with respect to parents 300 and 302, and corresponding boundary points 314 and 316 are defined for child 304 and 306, respectively. Boundary point 310 defines portion 320 of chromosome 300 and portion 322 of chromosome 302, and boundary point 312 defines portion 330 of chromosome 300 and portion 332 to chromosome 302. Child chromosome 304 is created, with portion 324 corresponding to portion 322 of parent 302, and portion 326 corresponding to portion 320 of parent 300. Similarly, child chromosome 306 is created, with portions 334 and 336 corresponding to parent portions 330, 332, respectively.

Genetic algorithm 106 continues the iteration process, of generating new populations from proceeding populations, and testing them, until some stop criteria is achieved. In this way, a result returned from executing an API may be fed back into the next iteration, thus using an API against itself and, apparently, increasing the likelihood of breakage. Example stop criteria include elapsed time, number of populations evaluated, population fitness achieved, population fitness no longer improving, or a break occurs. Running the program for time versus generations will allow the program to run overnight. Example breaks include system exceptions from an API or command, or failure of a protocol. An example of such a failure would be in connection with invasive testing of a security system—the failure being, for example, permitting access to a locked or protected facility.

When repeated searches drive toward a sequence of tests resulting in the same fatal errors, a low value may be assigned to the fitness function. This drives the search away from the errors and allows further testing to be accomplished. Alternatively, the errors may be fixed, and then testing continued. The fitness function can also be changed to use additional information about the APIs or commands, thus accommodating the characteristics of the fitness landscape near by the major exceptions.

In accordance with the method of this invention, and by way of explanation of the manner of operation of the testing facility 104, 108 (FIGS. 1 and 2), a testing system 104 is provided using GAs 106 to find software bugs in API implementations. In the preferred embodiment of this testing facility:

a) chromosomes 210, 212, 214 encode an ordered set of API calls 222, 224 or command invocations, b) chromosomes 210, 212, 214 also encode parameter information 232, 234 . . . for the API call or command invocation, and c) the fitness function of the GA is a distributed application.

The chromosome uses order-based encoding to represent an API call or command invocation 230, followed by ordered parameter codes 232, 234. See, Davis, L. ed. (1991), *Handbook of Genetic Algorithms*, New York, N.Y. (1991): Van Nostrand Reinhold. Encoding is at the byte level, allowing simple associative-array decoding of call and parameter codes. The genetic operations of order-based crossover and mutation (byte, non-order based) is used. (Other known order-based operations of swap and point-insertion, are not used in this embodiment.)

GA 106 uses standard techniques and parameters (Goldberg, 1989). For an explanation of such techniques and parameters, see Goldberg, D., *Genetic Algorithms in Search, Optimization & Machine Learning*, Reading, Mass. (1989): Addison-Wesley Publishing Company, Inc. In one embodiment of the invention, for example, an 80% single-point crossover, roulette wheel selection (dropping individuals with less than 10% of total fitness) and 2% (per individual) mutation, and a constant population size are used. The first generation is a population 201 of randomly generated chromosomes.

In accordance with the method of the invention, the cycle to process a single GA population, say 202, comprises: on GA-host system 100, using each chromosome to derive an API test case (the phenotype);

sending each API test 201, 202, 203, . . . to test system 102 where the API calls 222, 224, . . . or command invocations are executed;

sending the API test results back to GA hosting system 100;

evaluating the results in GA 106; and selecting chromosomes 210, 212, . . . with higher fitness proportionally for the next generation.

In alternative embodiments to roulette wheel selection, other selection techniques may be utilized. For example, random selection may be used to assist in developing a baseline for performance, in which every individual in each population is randomly chosen. Also, a 'top percent' selection may be used, in which the top 50% of the individuals in a population are copied into the next generation, with random individuals filling out the rest of the (constant size) population. This family of selection techniques relies on mutation and random individuals only, and does not employ crossover. This approach is an adaptation of Fogel, D. B., *Evolutionary Computation*, New York, N.Y. (1995): IEEE.

Comparisons of these selection techniques (roulette wheel, top percent and random) show these initial results:

All three selection methods are able to find the same basic set of exceptions.

The top percent (50%, without crossover) seems to find exceptions faster than roulette wheel. This is expressed as average number of individual chromosomes, across populations, where population size is constant per run and different runs are made with different population sizes.

Varying population sizes (4, 6, 20, 30) have the expected effect within a selection method and do effect the relative results across selection methods.

Whereas roulette wheel selection could be run for as much as 5 minutes without finding an exception, top percent and random selection rarely run more than 3 minutes without finding a exception.

By way of example, runs may go to 100–400 generations and last less than five minutes, until reaching an exception. During the testing, the exceptions are maintained so that additional results can be compared to the same target APIs and exceptions.

Additional variations on the GA operators such as tournament selection, including the mutation percentage in the chromosome, and multi-point crossover may result in decreased search time. Other known order-based genetic operations, such as swap or point-insertion, may also be used. For such order-based genetic operations, see Davis, supra.

Chromosome decoding uses various kinds of information about the API or commands being tested to create a specific API test case (phenotype). Associated with each API or command is a set of possible valid values. These value sets are used both in chromosome decoding and in the fitness evaluation function.

The fitness landscape (space) for locating actual program bugs is not well understood. It is perhaps very flat, with only rare, and very sudden, peaks. By this invention, GA 106 is implemented in a manner which improves significantly upon random search in such a space. In this embodiment of the invention, the fitness function is a weighted sum of various factors of a test response. Since each test may include many calls, each of these factors is itself a composite. The overall fitness is scaled so that the effect of numbers of calls is, by itself, not a factor. The following describes the fitness function:

single call fitness=W1*rcok+W2*rcnok+W3*rcexcp+ W4*seq1+W5*seq2+W6*seq3+W7*seq4 test case fitness=scaled sum of single call fitness's where,

W1–W7 weights (0–1.0)

rcok return code valid flag (0,1)

rcnok return code error flag (0,1)

rcexcp exception flag (0,1)

seq1–2 sequence factors 1 to 4 (infra)

The three "rc*" flags are mutually exclusive—only one may have a '1' value per call or invocation. The sequence factors are explained in more detail below. The main purpose of the invention is to find previously undetected errors, so the key factor in weighing each test is the presence of any exceptions generated by the operating system. These are evaluated highly (by weight W3). When such an individual is found, the test case (phenotype) is saved to a file by report block 130, for later analysis and symptom re-creation. Next in value are test cases with well-defined errors or return codes. Lowest are test cases with no errors. The value set associated with each API and command is used in the evaluation component 118, by rating more highly results outside the value set.

The rationale for evaluating defined error conditions more highly than no errors, is simply the hypothesis that error paths and states in the API implementation are likely to have been less exhaustively tested, as compared to the 'normal function' paths. Hence, if the GA population is steered toward individuals that exercise defined error conditions and states, the chances are better that a real exception might occur. If this hypothesis is incorrect, the fitness function weights for normal and error conditions results may be changed. Another factor the fitness function exploits is the fact that each population individual is a sequence of API calls. Selected subsequences are identified as useful, based on expected or recommended usages for the APIs. (Note, however that this does not exclude tests that have other sequences.)

As part of fitness evaluation by evaluation component 118, the response is analyzed to determine 'sequence-related' factors such as:

seq1 the number of selected subsequences started;
seq2 the number of selected subsequences completed;
seq3 the length of the longest subsequence; and
seq4 the length of the longest complete subsequence.

These factors are weighted separately.

The term "call-space" is used for the set of permutations of N calls of APIs or command invocations, taken R at a time, with replacement. So the call-space has N**R elements.

The fitness function (FF) for the individual is based on the return value of the individual, where a higher number is better than a lower number. The FF is determined by giving a value to each API call in the individual, where a valid completion message is a low number, an expected error condition is a medium number and a 'fatal error' is a high number. These numbers are added together to get an overall fitness for the individual. Certain sequences also have fitness points associated with them. Some sequences will be encouraged over others, by giving additional fitness points to some specific sequences. There are a few sequences that are encouraged for this API set, and a couple of sequences that are being discouraged, by assigning a value of 'low' to that sequence.

In a preferred embodiment of the invention, the individuals used in the implementation of the GA, include a byte for each of the different API calls. For example, in a case involving 18 calls (API1, API2, ..., API18) equally distributed over 256 possible values, the numbers from 1-14 represent API1 and the numbers from 15-28 represent API2, etc. Numbers that do not fit in the range are no-ops. For this example set of API calls the individual contains 15 calls, of which each call is one of the 18 API's in the test. In this set of API's there are an average of three parameters for each API call. The value-set for each parameter must be predefined and contains some number of possible values, again each value is represented by one byte, evenly distributed over a 256 byte range. For example a parameter must be an integer in the range of 1-100. The number which represents the value in a value-set from the individual, follows the 15 API calls.

Each separate call or invocation also has a set of possible test instances that depend on the number of parameters and allowed values for each, termed the parameter-space. A simple estimate of the parameter space is given by Pspace= AP*VS where AP is the average number of parameters per API or command and VS is the assumed lower bound on the number of values in the parameter value set.

An estimate of the size of the GAs search space is test space=Cspace * Pspace. The motivation for using sequences as part of the evaluation is a) to reduce the amount of time spent searching highly unlikely areas of the huge (0(10*20)) space and b) the GA's search is steered to areas of the call-space that actual users of the API are likely to work in, hence improving the value of any previously unknown errors. (Not all errors are of equal cost to fix. It is standard practice in the industry to postpone fixing some problems until a later release, as a way of reducing costs. This may be done because the problem is extremely rare, there is simple work-around, or the consequences are trivial.)

Problems found in software may be due to unexpected internal interactions within the API implementation, which maintains state information and relates to the high volume of calls generated. Such problems are found as the GA wanders into untested portions of the API call-space. In this manner, GAs as implemented by this invention may indeed be a viable addition to existing software testing practices.

As an example of the output to and from report generate component 130, consider an example based upon test driver code for 18 'Unix-style' APIs with an average number of parameters per API of 2.67, with only 3 valid values per parameter, and with 15 being the maximum number of calls allowed in a single chromosome. (Hence search space is over 18**15, without considering the effect of varying parameter values.) On numerous runs of GA 106, the population may reach a plateau on average fitness and the maximum fitness individual, which condition, if it persists indefinitely, would suggest that the GA operators can be improved, perhaps with simply a higher mutation rate. The following figure shows summary population information from report generate component 130 for 10 generations of 18 test individuals ('inds') each. The 'avg eval seconds' is the average evaluation duration per individual. Notice that one individual in generation (pop#) 1 shows as not completed (that is, only 17 of the 18 individuals completed), which is most likely due to test system load.

| pop# | avg f   | highest f | avg Ncall | avg eval seconds | # inds complete |
|------|---------|-----------|-----------|------------------|-----------------|
| 0    | 2.05198 | 8.82857   | 5.83      | 0                | 18              |
| 1    | 3.33577 | 8.84286   | 7         | 0.722            | 17              |
| 2    | 4.69483 | 8.82857   | 6.78      | 0                | 18              |
| 3    | 3.93402 | 8.82857   | 6.56      | 0                | 18              |
| 4    | 5.25653 | 8.82857   | 6         | 0.0556           | 18              |
| 5    | 5.92163 | 8.82857   | 5.17      | 0                | 18              |
| 6    | 5.97712 | 11.2286   | 4.56      | 0                | 18              |
| 7    | 8.16717 | 11.2286   | 5.89      | 0                | 18              |
| 8    | 7.48968 | 11.2286   | 5.67      | 0                | 18              |
| 9    | 8.33611 | 11.2286   | 6.33      | 0.0556           | 18              |
|      |         |           |           |                  | 179             |

ADVANTAGES OVER THE PRIOR ART

Using a distributed fitness function, which includes the execution of the API tests, has various advantages. The portion of the fitness function which executes on the test system has been kept to a minimum. A single GA-based test generator might drive multiple test systems. Individuals can also be sent to different (homogeneous) test systems, speeding up the evaluation function. In addition, this allows the generating system to be a different operating system than the test system, and minimizes the amount of function that is test-system specific. Further, it directly supports testing of APIs or commands that have multiple-system effects or interactions.

This also allows the generalization of the test cases to include operating system commands, object methods, and any combination of APIs, command or methods.

Despite the distributed nature of the fitness function, tens or hundreds of thousands of API calls are easily generated, executed and evaluated in a few minutes. This is typically many times the size of the predefined test suite for a set of APIs.

By finding 'fatal errors', the invention provides direct savings to the software provider, including time and effort required by the service personnel, the development team, as well as to customers, who are saved the time and energy to get the changes and make the fixes. The largest savings are of course to the customer, who will never see these bugs.

ALTERNATIVE EMBODIMENTS

It will be appreciated that, although specific embodiments of the invention have been described herein for purposes of illustration, various modifications may be made without departing from the spirit and scope of the invention.

For example, in addition to being functionally important, APIs and commands have the advantage that writing a test driver function is relatively simple, and requires no access to product or operating system 'internals'. Thus, while the above described embodiments of the invention, use GAs to test APIs and commands with varying parameters to find new (unknown to development) software errors, this may be extended by such access to test situations of increased complexity.

Similarly, GAs may be used in testing software in earlier phases of development, such as unit test. Also, digital signals implementing the system of the invention, and also useful for controlling the operation of a digital system in accordance with the method of the invention, may be stored in computer memory, in magnetic or optical, or the like, storage, and transmitted over electrical, optical or other equivalent transmission links 121.

Accordingly, the scope of protection of this invention is limited only by the following claims and their equivalents.

We claim:

1. Method of operating a digital computer to generate symptoms of errors in source code, comprising the steps of:
   a) generating from order-based genetic algorithms at a testing system a set of coded representations of sequences of function invocations;
   b) executing said source code on a target system;
   c) sending said set of coded representations to said target system;
   d) interpreting on said target system the coded representations in said set to generate a sequence of function invocations;
   e) interpreting function invocation results in sequence;
   f) collecting said sequence of function invocations and returning said sequence and said results to said testing system;
   g) evaluating said results to identify symptoms of errors.

2. The method of claim 1, further comprising the steps of:
   h) responsive to said evaluation results, generating a new set of coded representations of function invocations, and with that new set; and
   i) repeating steps a through g.

3. The method of claim 2, wherein step g) further comprises the steps of:
   g1) performing a fitness evaluation, including:
      maintaining a set of class object representations of the function invocations under test;
      recognizing in said function invocation results those which match one of said coded representations; and discovering the result category;
   g2) repeating step g1) for each function invocation in the sequence;
   g3) evaluating the invocation sequence independent of said results for its value in finding errors; and
   g4) feeding said value and said result category into step h).

4. The method of claim 1, wherein step e) further comprises the steps of:
   e1) responsive to generation of information results, inserting information results in the collected sequence;
   e2) responsive to generation of action results, inserting representations of the return code in said collected sequence; and
   e3) responsive to generation of exception results, inserting representations of exception codes in said collected sequence.

5. The method of claim 1, wherein said step d) further comprises the steps of:
   d1) parsing said coded representations into commands;
   d2) parsing each parameter; and
   d3) constructing each parsed parameter into machine representations in sequence, including:
      for scalar parameters, converting said coded representations into machine coding; and
      for pointer parameters, constructing from said coded representation applications specific data types which are pointers to objects, structures, or the like.

6. A system for detecting symptoms of software errors, comprising:
   an order-based genetic algorithm for generating test sequences which converge on points in invocation space more likely to cause error symptoms; and
   a test interface for interpreting and executing said test sequences, and returning execution results to said order-based genetic algorithm for use in generating subsequent test sequences.

7. The system of claim 6 wherein said order-based genetic algorithm includes a cross population manager and an evaluation component.

8. The system of claim 7 wherein said cross population manager comprises means for generating a first population of test sequences and subsequent populations of test sequences, each such sequence defining a plurality of calls or command invocations for execution by said test interface.

9. The system of claim 8 wherein said evaluation component comprises means for executing a fitness function to provide an evaluated population of parent chromosomes for use by said cross population manager in deriving the child chromosomes defining a subsequent population.

10. The system of claim 9 wherein said fitness function is a weighted sum of execution result factors.

11. Apparatus for storing signals for controlling the operation of a digital computer, said signals comprising:
   order-based genetic algorithm signals for operating said digital computer to generate test sequences which converge on points in invocation space more likely to cause error symptoms; and
   test interface signals for operating said digital computer to interpret and execute said test sequences, and return execution results for use in generating subsequent test sequences.

12. A digital transmission link for transmitting signals for controlling the operation of a digital computer, said signals comprising:
   order-based genetic algorithm signals for operating said digital computer to generate test sequences which converge on points in invocation space more likely to cause error symptoms; and
   test interface signals for operating said digital computer to interpret and execute said test sequences, and return execution results for use in generating subsequent test sequences.

* * * * *